United States Patent
Rauhala et al.

(10) Patent No.: US 10,157,312 B2
(45) Date of Patent: Dec. 18, 2018

(54) IRIS RECOGNITION

(71) Applicant: Microsoft Technology Licensing, LLC, Redmond, WA (US)

(72) Inventors: Jyri Rauhala, Tampere (FI); Pertti Husu, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/878,517

(22) Filed: Oct. 8, 2015

(65) Prior Publication Data
US 2017/0103261 A1   Apr. 13, 2017

(51) Int. Cl.
| G06K 9/00 | (2006.01) |
| G06K 9/20 | (2006.01) |
| G06K 9/62 | (2006.01) |
| H04N 5/225 | (2006.01) |
| H04N 7/18 | (2006.01) |

(52) U.S. Cl.
CPC ..... *G06K 9/00604* (2013.01); *G06K 9/00597* (2013.01); *G06K 9/00899* (2013.01); *G06K 9/20* (2013.01); *G06K 9/6202* (2013.01); *H04N 5/2256* (2013.01); *H04N 7/181* (2013.01)

(58) Field of Classification Search
CPC ............. G06K 9/00604; G06K 9/6202; H04N 5/2256
USPC ....................................... 382/117
See application file for complete search history.

(56) References Cited

U.S. PATENT DOCUMENTS

| 5,016,282 A | 5/1991 | Tomono et al. |
| 6,320,610 B1 | 11/2001 | VanSant et al. |
| 6,591,064 B2 | 7/2003 | Higashiyama et al. |
| 6,714,665 B1 * | 3/2004 | Hanna ..................... G06K 9/00 382/106 |
| 7,130,453 B2 | 10/2006 | Kondo et al. |
| 8,064,647 B2 | 11/2011 | Bazakos et al. |
| 8,092,021 B1 | 1/2012 | Northcott et al. |
| 8,260,008 B2 | 9/2012 | Hanna et al. |
| 8,391,567 B2 | 3/2013 | Friedman et al. |
| 8,433,103 B2 | 4/2013 | Friedman et al. |
| 8,705,808 B2 | 4/2014 | Determan et al. |
| 2009/0046249 A1 | 2/2009 | Northcott et al. |
| 2012/0293643 A1 | 11/2012 | Hanna |
| 2013/0135513 A1 | 5/2013 | Choi et al. |
| 2013/0194408 A1 | 8/2013 | Hanna et al. |
| 2015/0062324 A1 | 3/2015 | Choi |

FOREIGN PATENT DOCUMENTS

| WO | 8605018 A1 | 8/1986 |
| WO | 2015081325 A1 | 6/2015 |

OTHER PUBLICATIONS

Bashir, et al., "Eagle-Eyes: A System for Iris Recognition at a Distance", In IEEE Conference on Technologies for Homeland Security, May 12, 2008, pp. 426-431.
"International Search Report and Written Opinion Issued in PCT Application No. PCT/US2016/054035", dated Apr. 5, 2017, 17 Pages.

* cited by examiner

Primary Examiner — Ruiping Li

(57) ABSTRACT

A method may comprise obtaining image data of a plurality of digital image frames captured of an assumed eye having an iris and a pupil while illuminating the assumed eye from different directions; and automatically detecting a characteristic feature of the iris on the basis of image data of the at least two of the plurality of digital image frames.

22 Claims, 7 Drawing Sheets

IRIS RECOGNITION

BACKGROUND

Iris recognition may be used as a biometric identification method for various authentication or security purposes. Iris recognition may be based on detecting one or more characteristic features of an iris on the basis of image data captured of an eye by an image sensor. An apparatus carrying out the detection process may be implemented as a specific apparatus designed for iris recognition purposes. Alternatively, equipment for iris recognition purposes may be incorporated as a part of another type of apparatus or device such as, for example, a mobile or portable electronic device.

The reliability of detection of characteristic features, and thus iris recognition, may be affected by illumination and sensing component properties and locations, as well as by iris recognition algorithm details.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method is disclosed which may be used for iris recognition purposes. The method may comprise obtaining image data of a plurality of digital image frames captured of an assumed eye having an iris and a pupil while illuminating the assumed eye from different directions; and detecting a characteristic feature of the iris on the basis of image data of at least two digital image frames of the plurality of digital image frames.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 7, the apparatuses are illustrated as schematic drawings. The drawings are not in scale. The methods of FIGS. 8 to 11 are illustrated as flow charts.

DETAILED DESCRIPTION

The detailed description provided below in connection with the appended drawings is intended as a description of a number of embodiments and is not intended to represent the only forms in which the embodiments may be constructed, implemented, or utilized.

Figure 1:
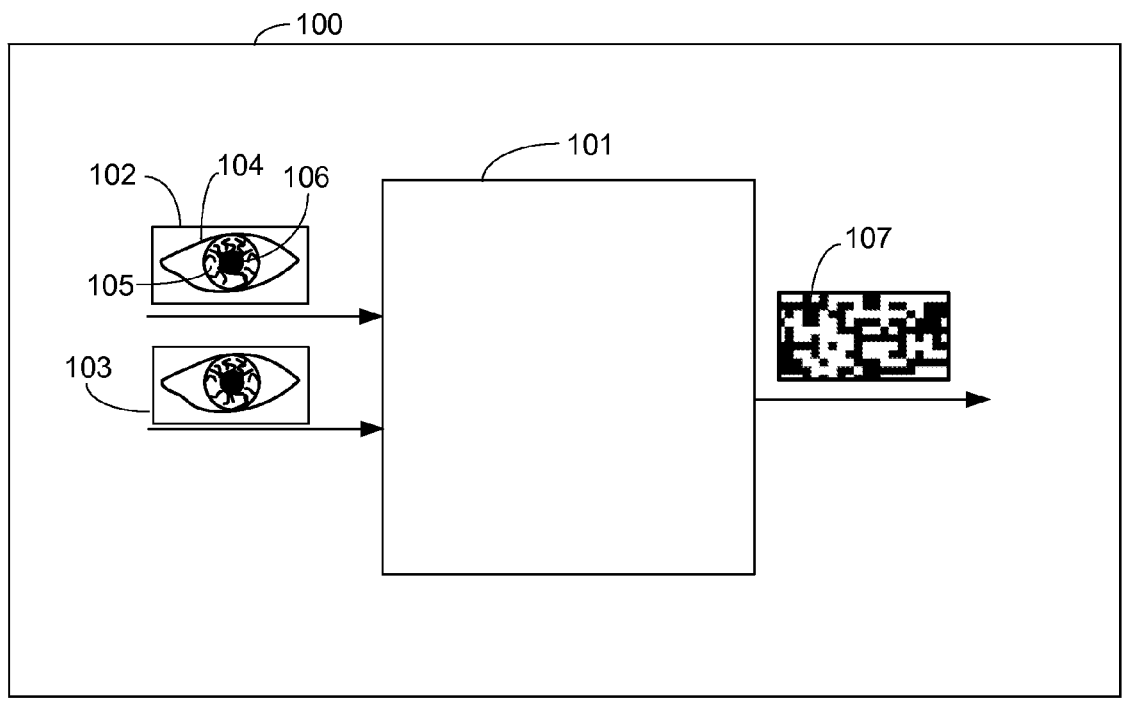
FIG. 1 illustrates a block diagram of an apparatus which may serve for iris recognition.

The apparatus 100 of FIG. 1, illustrated as a schematic block diagram in the drawing of FIG. 1, is configured to obtain image data and detect a characteristic feature of an iris of an assumed eye on the basis of the obtained image data. The apparatus may serve for recognizing an iris of a human eye. Recognizing an iris may comprise, for example, comparing one or more detected characteristic features of an eye with corresponding predetermined one or more characteristic features of an existing eye to determine whether the eye at issue is that particular existing eye. Characteristic features of a plurality existing eyes may have been detected and/or determined and stored in a way enabling such comparison of the characteristic features of an eye under examination with characteristic features of a plurality of existing eyes.

The apparatus 100 of FIG. 1 comprises a processing unit 101. In the following, the operation of the processing unit, when in use, is discussed.

When in use, the image processing unit 101 obtains two digital image frames 102, 103 captured of an assumed eye 104 having an iris 105 and a pupil 106 while illuminating the assumed eye from different directions for the capture of the two digital image frames.

"Obtaining" the digital image frames, or any other data content, refers to any appropriate way of providing available, for automatic data processing and/or storage purposes, such data content. For example, such data content or a part of such may be obtained via any appropriate wired or wireless data transmission path from another device or apparatus or another unit of the same apparatus, from an external data server or, for example, from a cloud service. Such data content may also be stored in or on any appropriate data storage unit, element, medium, or device, from which the processing unit may obtain the data content. Obtaining may also comprise generating at least part of the data content at issue. For example, image data of a digital image frame may be "obtained" by capturing a digital image frame by an image sensor.

A "digital image frame", or shortly a "frame", refers to a data content captured via exposure of pixels or some other light-sensing element(s) of an image sensor. A frame thus comprises image data enabling composition of a displayable digital image on the basis of that image data. Image data of a digital image may comprise, for example, information about light energy received by pixels of an image sensor.

Obtaining image data of a frame refers to obtaining at least part of the complete image data of that particular frame. Thus, it may be not necessary to obtain all the image data of that frame, but it may be sufficient in some cases to obtain, for example, just image data corresponding to a particular portion or area of the frame.

"An assumed eye" refers to an object determined as a possible eye of a human being. An assumed eye and the location thereof may be detected, recognized, or determined beforehand, by the apparatus 100 or by another apparatus or device.

An "iris" and "pupil" refer to an iris and a pupil of an eye of a human being, or of the assumed eye.

Being illuminated from different direction means that the directional distribution of light incident on the assumed eye differs at least partially between the capture of the two digital image frames.

Further, when in use, the image processing unit detects at least one characteristic feature 107 of the iris on the basis of the obtained image data of the two digital image frames.

"A characteristic feature" of the iris refers to any characteristic property of the iris, which property is detectable and which can be used to identify or recognize the iris, i.e. to determine that the iris at issue belongs to an eye of a particular person. "At least one characteristic feature" may actually comprise a plurality of, i.e. a set of characteristic features, which may enhance the reliability of the recognition or identification process. Such set of characteristic features may be detected, for example, along the circumference of the annular iris, and coded, for example, into a two-dimensional feature map, such as a bar code or a QR (Quick Response) code. In the embodiment illustrated in FIG. 1, a plurality of characteristic features 107 are coded to form such two-dimensional chart.

"Detecting" a characteristic feature of the iris may refer to any appropriate way of determining the existence, location, and/or detailed properties of such feature. As described above, once detected, such characteristic feature can be compared with corresponding characteristic feature of an existing eye to determine whether the characteristic features indicate that the assumed eye is that particular existing eye.

Detecting the one or more characteristic features of the iris on the basis of the obtained image data of the two digital image frames means that said detection is not based on selection of one of the two digital image frames and detecting the one or more characteristic featured on the basis of image data of that selected digital image frame only. Instead, at least part of the obtained image data of both of the two digital image frames is used in said detection. This may improve the reliability of the iris recognition process, because the presence of a characteristic feature in one of the digital image frames may be confirmed by the presence of the same characteristic feature in the other digital image frame also.

Further reliability improvement may be provided due to the fact that an iris is a three-dimensional structure which is partially transparent, i.e. incident light can partially penetrate to the iris, below its surface. Therefore, light reflected and scattered from an iris towards an image sensor shooting the iris may vary depending on the direction from which the iris is illuminated. Thereby, the image data of a digital image frame may depend on the illumination direction. Some features of the iris may be poorly detectable in digital image frames captured while illuminating from a particular direction, whereas illumination from another direction may make such feature more clearly detectable. Therefore, detection of a characteristic feature or a plurality of characteristic features on the basis of the two differently illuminated digital image frames may provide additional information on the iris structure, and therefore improve the reliability of the iris recognition process.

In particular, image data of two digital image frames captured while illuminating the assumed eye from different directions may provide information of the three dimensional structure, such as a specific three dimensional characteristic feature, of the iris. Such three dimensionality information may be based on, from example, different shadows forming with the different illumination directions.

The apparatus 100 of FIG. 1 may be a specific apparatus or device specifically designed for iris recognition purposes. Alternatively, the same apparatus may be configured to serve for other purposes also. In both cases, the apparatus may be implemented as, or incorporated in various types of access control apparatuses or systems controlling access of persons through a door, gate, or some specific access point.

In addition to actual physical access control, the apparatus 100 of FIG. 1 may be implemented as, or incorporated in, an electronic apparatus, device, or system, such as a personal computer, where iris recognition may be used for user identification to control access to the apparatus, device, or system, or to an application run on such apparatus, device, or system. Other examples of such electronic devices and systems comprise, for example, cash dispensers, automated teller machines, and various types of electronic payment terminals. Such device may also be a portable or mobile device, such as a laptop computer, a tablet computer, a mobile phone, or a smartphone, without being limited to these examples. In general, the apparatus, device, or system in which the iris recognition equipment are incorporated and in which the iris recognition method is carried out may be an any type of apparatus, device, or system where iris recognition or characteristic feature detection may be used, for example, for identification or authentication purposes.

Figure 2:
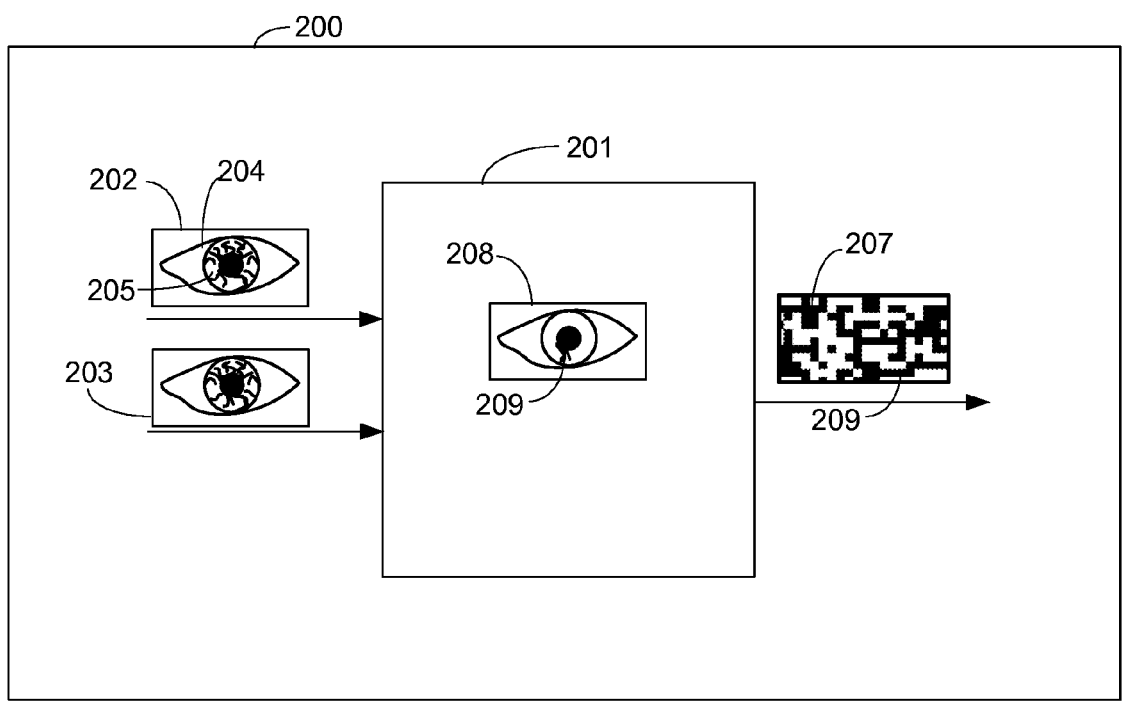
FIG. 2 illustrates a block diagram of an apparatus which may serve for iris recognition.

The apparatus 200 of FIG. 2 differs from that of FIG. 1 in that, when in use, the processing unit 201 thereof generates an auxiliary image frame 208 on the basis of the obtained image data of the two digital image frames captured while illuminating the assumed eye from different directions.

An "auxiliary image frame" refers to an artificial digital image frame, the image data of which is generated on the basis of the obtained image data of the two digital image frames, i.e. so that image data of both of the two digital image frames affect the image data of the auxiliary image frame.

The image data of the auxiliary image frame may be generated so that it comprises information on differences between the image data of the two digital image frames captured while illuminating the assumed eye from different directions. As one example, an iris feature 209 appearing differently in the two digital image frames is illustrated in the auxiliary image frame 208 in the drawing of FIG. 2. The image data of the auxiliary image frame may be called auxiliary image data.

For example, for parts of the image data corresponding to areas of the two digital image frames where the image data of those two frames are substantially equal, the image data of the auxiliary image frame may be set in accordance with one of the two digital image frames. Instead, for parts of the image data corresponding to areas of the two digital image frames with substantially different image data, the image data of the auxiliary image frame may be set so as to indicate the differences between the two digital image frames.

The processing unit 201 of the apparatus 200 of FIG. 2 detects, when in use, two or more characteristic features 207, 209 of the iris 205 of the assumed eye 204 on the basis of the image data of the auxiliary image frame. The processing unit thus first combines the image data of the two digital image frames 202, 203 into image data of a single image data, namely, the auxiliary image data, and detects the characteristic feature(s) on the basis of this image data. Because the auxiliary image data is generated on the basis of the two digital image frames, the processing unit 201 of the apparatus of FIG. 2 detects the characteristic feature(s) on the basis of the obtained image data of the two digital image frames. However, the processing unit of FIG. 2 performs the actual detection of the characteristic feature on the basis of the auxiliary image frame 208 instead of directly detecting the characteristic feature from the two separate digital image frames.

Figure 3:
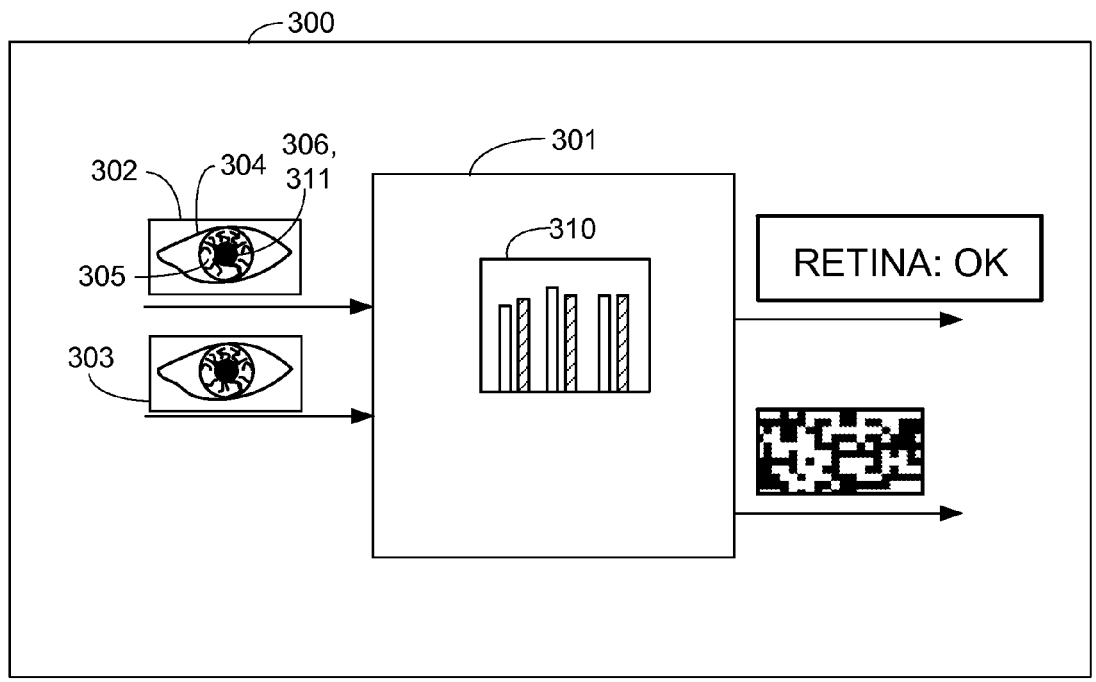
FIG. 3 illustrates a block diagram of an apparatus which may serve for iris recognition.

The apparatus 300 of FIG. 3 may be mainly in accordance with any of the apparatuses of FIGS. 1 and 2. It differs from those apparatuses in that in addition to obtaining image data of two digital image frames 302, 303, the processing unit 301 of the apparatus also generates, when in use, comparison data 310 dependent on, i.e. correlating with, similarities in parts of the image data of the two digital image frames corresponding to an area of the assumed eye 304. The similarities may comprise, for example, similar light energy or intensity received in one or more corresponding pixels of the two digital image frames. Such pixels may be selected so that they correspond to a particular predetermined area of interest of the assumed eye. Such particular "area of interest" may be any appropriate area, on the based on which presence of a verification feature in the assumed eye, the verification feature indicating a real eye, may be determined. For example, the area of interest may be an area of the iris of the assumed eye.

In another embodiment, instead of generating the comparison data, the processing unit may obtain such comparison data by receiving ready generated comparison data from another unit or module of the apparatus or from another apparatus, device, or system or, for example, from a cloud service.

Further, the processing unit of the apparatus of FIG. 3 determines, on the basis of the comparison data 310, presence of at least one verification feature in the assumed eye indicating a real eye. Determining presence of a verification feature means determining whether the assumed eye comprises the verification feature.

A "verification feature" refers to any kind of feature, detectable in the image data of the two digital image frames, on the basis of which verification feature a conclusion may be made whether the assumed eye is a real eye. A verification feature may be used to verify that the assumed eye is a real eye and not, for example, an image of an eye.

The three dimensional nature and the partial transmittance of a real human eye may result in that, with specific differences in the illumination between the two digital image frames, there are areas or points in the eye with one or more features producing differences in the image data of the two digital image frames. Such differences in the image data may therefore indicate a real eye. Lack of any substantial difference between the image data of the two digital image frames for such area or point may indicate that the assumed eye is not a real eye but, for example, an image of a real eye.

Determining the presence of at least one verification feature indicating a real eye may improve the reliability of an iris recognition process, for example, by preventing passing the iris recognition using, for example, an image of an eye instead of a real eye.

In the embodiment of FIG. 3, the area of interest is an area of the pupil 306 of the assumed eye, and the verification feature of the assumed eye indicating a real eye is a retina 311 located behind the pupil 306 of the assumed eye. For example, when illuminating the assumed eye from a direction of the optical axis of the image sensor used to capture the different directions, the retina visible through the pupil of the assumed eye reflects light back towards the image sensor. With illumination from a direction substantially inclined relative to the optical axis, such reflection may strongly decrease. In an embodiment, this is utilized in that one of the two digital image frames is captured while illuminating the assumed eye substantially from the direction of the optical axis, and the processing unit obtains comparison data which is dependent on similarities in parts of the image data of the two digital image frames corresponding to areas of the pupil of the assumed eye.

With regard to obtaining the digital image frames and detecting the characteristic feature(s) of the iris of the assumed eye, the processing unit of the apparatus of FIG. 3 may operate similarly to any of the apparatuses of FIGS. 1 and 2. For example, the processing unit 301 may be configured to generate an auxiliary image frame similarly to the processing unit of FIG. 2.

In other embodiments, instead of two, the image data obtained by the processing units of FIGS. 1 to 3 may comprise image data of three or more digital image frames. In general, the obtained image data may comprise image data of a plurality of digital image frames, each frame having been captured with illumination from a unique direction differing from the illumination directions of the other digital image frames. Then, image data of more than two digital image frames may be used for detecting the characteristic feature(s) of the iris of the assumed eye and/or for determining the presence of at least one verification feature in the assumed eye. The image frames used for determining the verification feature(s) may be the same as those used for detecting the characteristic feature(s). Alternatively, at least one of the frames used for determining the verification feature(s) may be different from the frames used for detecting the characteristic feature(s), and vice versa.

Further, completely different groups of digital image frames may be used for determining the verification feature(s) and for detecting the characteristic feature(s). Such groups of digital image frames may be captured using a single image sensor. Alternatively, the different groups of digital image frames may be captured by different image sensors. Then, the same or different wavelength ranges may be used for illuminating the assumed eye for capturing the different groups of digital image frames.

With regard to the operations carried out by the processing units of the apparatuses of FIGS. 1 to 3, there are various possibilities for the processing units to be configured to perform those operations. For example, the processing unit may comprise at least one processor and at least one memory coupled to the at least one processor, the memory storing program code instructions which, when run on the at least one processor, cause the processor to perform the operations action(s) at issue. Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In any apparatus, the processing unit may be a separate unit specifically designed for the above operations. Alternatively, it may be a common processing unit of the apparatus also performing other operations and actions. The processing unit may be divided into two or more sub-units with separate purposes.

Figure 4:
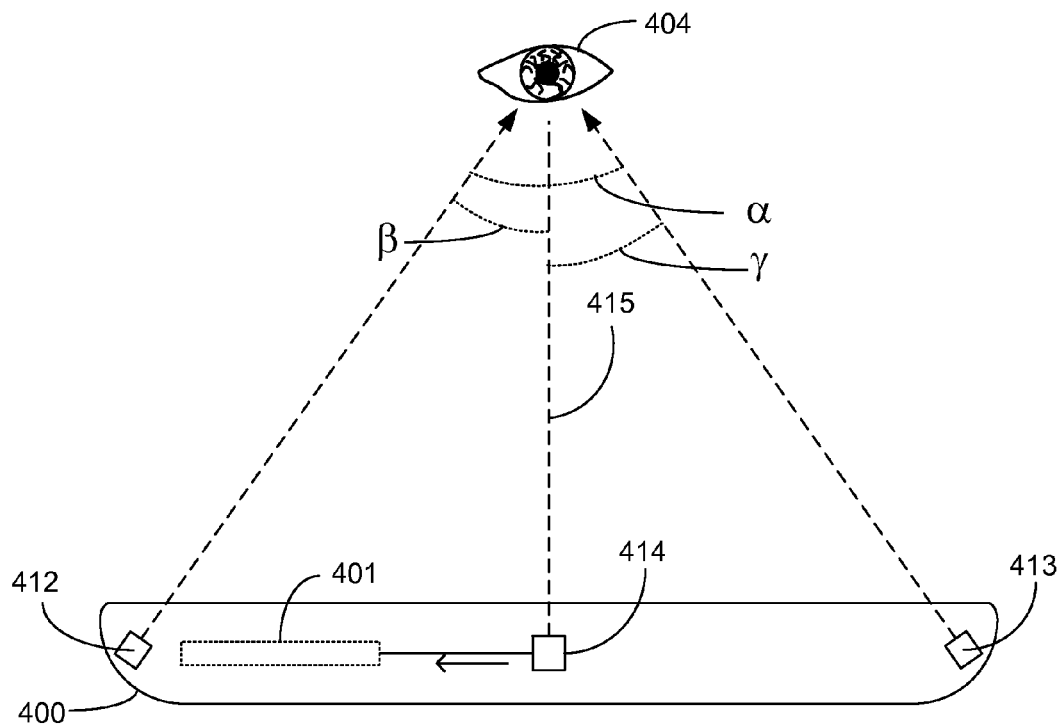
FIG. 4 illustrates a view of an apparatus which may serve for iris recognition.

The apparatus 400 FIG. 4, illustrated as a schematic sectional view, which apparatus may be in accordance with any of the apparatuses of FIGS. 1 to 3, comprises a first and a second illumination element 412, 413, which may comprise e.g. light emitting diode LEDs, and a first image sensor 414. The illumination elements are located so that the first illumination element illuminates, when in use, the assumed eye 404 from a first direction, and the second illumination element illuminates, when in use, the assumed eye from a second direction. The first and the second direction may be at an angle α of at least 10 degrees, preferably at least 15 degrees, relative to each other. In the embodiment of FIG. 4, the illumination elements 412, 413 are located at opposite edges of the apparatus, whereas the first image sensor 414 lies substantially at the center of the apparatus.

The first and the second illumination elements 412, 413 and the first image sensor 414 are configured and controlled so that, when in use, the first image sensor captures two digital image frames, a first digital image frame while illuminating the assumed eye by the first illumination element, and a second digital image frame while illuminating the assumed eye by the second illumination element.

The processing unit 401 of the apparatus is connected, by any appropriate wired or wireless data connection arrangement, to the first image sensor 414 so that it receives, when in use, the captured first and the second digital image frames. Thereby, the processing unit obtains those two digital image frames for further processing.

Due to the principle of detecting the characteristic feature(s) of the iris on the basis of image data of two or more digital image frames, high reliable iris recognition may be enabled with relatively low resolution, or pixel number, pixel number of the first image sensor 414. Such image sensor maybe be, for example, a Video Graphics Array VGA sensor or any other appropriate sensor type with relatively low resolution. The resolution requirement may be also affected by having an image sensor with a narrow field, whereby a large portion of the area of the digital image frames can be covered by the assumed eye and the iris thereof. Such low resolution, or pixel number, and efficient usage of the available image or frame area may simplify processing of the image data. The field of view of the first image sensor may be, for example, 5 or 3 degrees or less.

An image sensor with relatively low resolution, and thereby a relatively low amount of image data of single digital image frame may also allow capturing consequent digital image frames with a high frame rate, i.e. with a short time interval. This may improve the reliability of detecting the characteristic feature(s) of the iris and/or determining the verification feature(s).

The first image sensor 414 may be implemented as a plain digital image sensor connected to appropriate external power supply and control unit(s), and having also appropriate housing and optical system. Alternatively, it may be incorporated in a stand-alone imaging module or camera module which itself may comprise, in addition to the actual digital image sensor element, also e.g. control electronics.

The first image sensor 414 has an optical axis 415. The optical axis is a fictitious axis coinciding with the central line of the field of view of the sensor. It thus refers to the sensing direction of the image sensor. The first and the second illumination elements 412, 413, located at the opposite edges of the apparatus 400, lie at opposite sides of the optical axis 415 so that the first and the second direction are at substantially equal angles β, γ relative to the optical axis.

Illumination from the opposite sides of the optical axis may provide good distinguishability of three dimensional iris features, thereby improving the reliability of characteristic feature detection and further iris recognition. At the same time, such illumination may allow reliable determination of the presence of one or more verification features in the assumed eye.

The optical axis of the first image sensor may be adjustable, i.e. its direction may be tunable, e.g. by adjustable optics or by adjustable position of the image sensor itself. For example, arrangements and equipment known from digital camera modules with Optical Image Stabilization OIS may be present in the apparatus for this purpose. In one embodiment, the first image sensor may be arranged in a tilted design where the image sensor is tilted e.g. 90 degrees relative to the embodiment of FIG. 4, and where the optical axis is turned towards the direction of the assumed eye by one or more mirrors. Such mirrors may be rotatable to allow adjustment of the optical axis direction.

In addition to the lateral adjustment of the direction of the optical axis, also the focus distance and the field of view of the first image sensor may be adjustable. For example, actuators comprising a voice coil motor or piezo actuators may be arranged to move one or more lenses.

When the optical axis of the first image sensor is adjustable, also the position of the first and the second illumination elements may be adjustable, allowing adjustment of the first of the second directions together with the optical axis.

Figure 5:
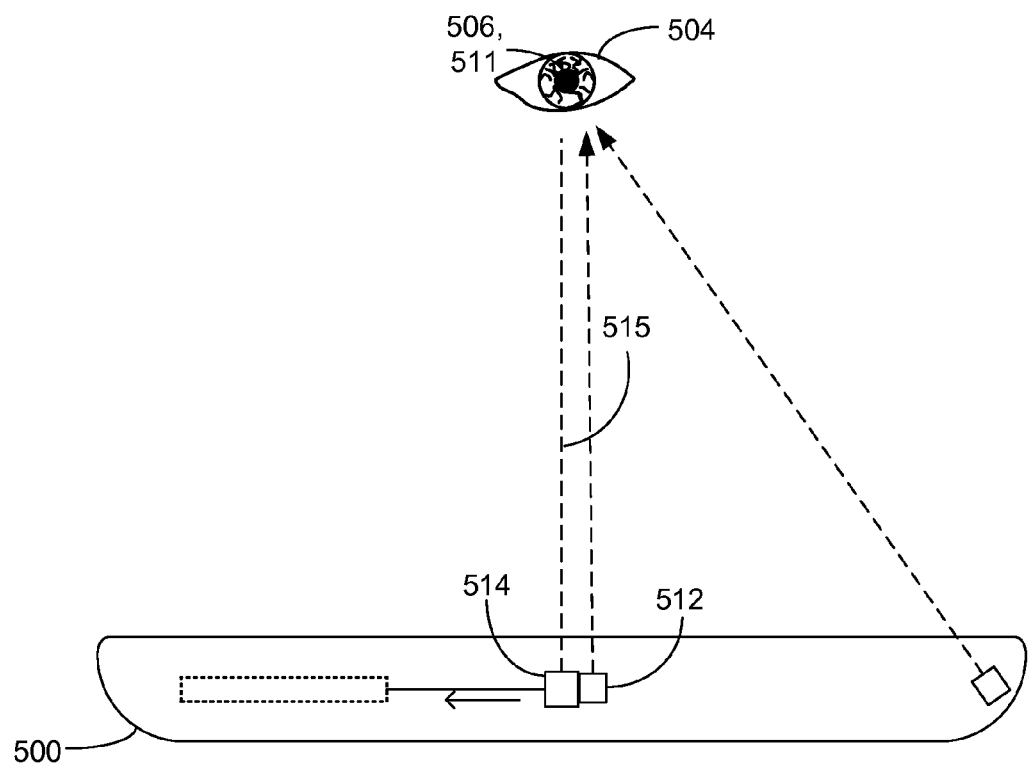
FIG. 5 illustrates a view of an apparatus which may serve for iris recognition.

The apparatus 500 of FIG. 5 differs from that of FIG. 4 in that the first illumination element 512 is located adjacent to the first image sensor 514 of the apparatus so that when in use, it illuminates the assumed eye 504 substantially from the direction of the optical axis 515. With this kind of illumination scheme, the same two digital image frames may serve both as a basis for detecting the characteristic feature(s) of the iris, and as a basis for generating comparison data dependent on similarities in parts of the image data of the two digital image frames corresponding to an area of the pupil, as described above with reference to FIGS. 1 to 3.

Figure 6:
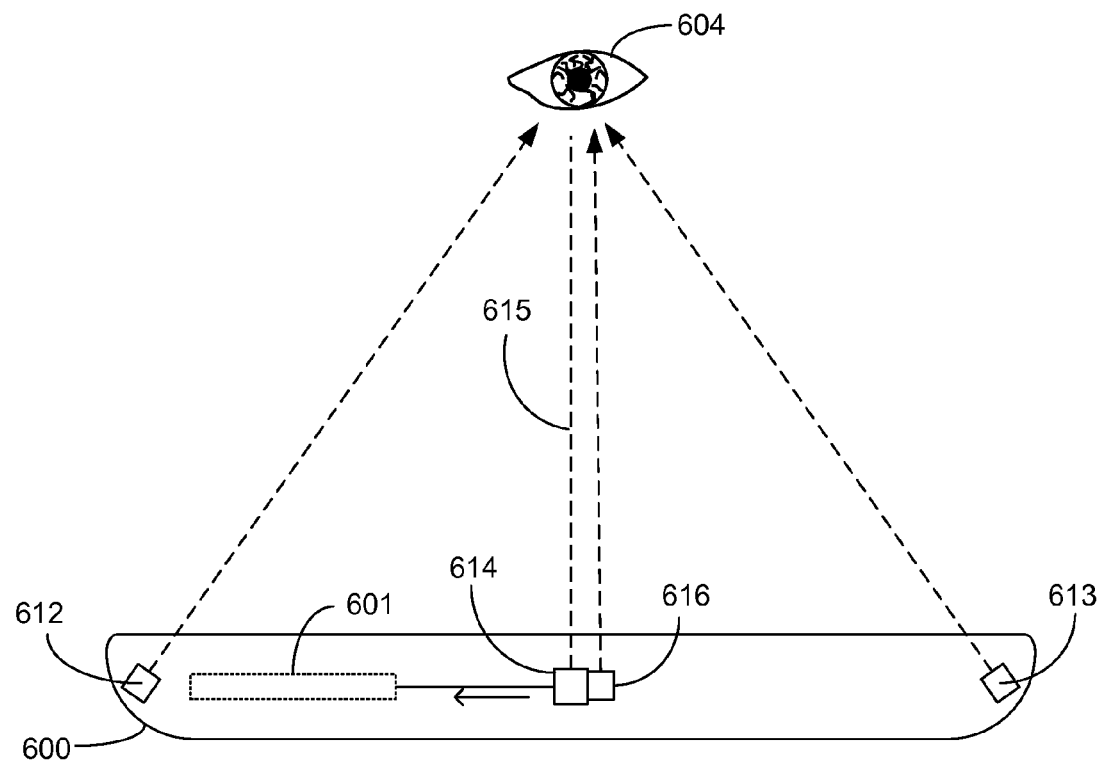
FIG. 6 illustrates a view of an apparatus which may serve for iris recognition.

The apparatus 600 of FIG. 6 differs from that of FIG. 4 in that it comprises, in addition to the first and the second illumination elements 612, 613, a third illumination element 616 located adjacent to the first image sensor, correspondingly to the first illumination element 512 of the apparatus of FIG. 5.

Using the apparatus 600 of FIG. 6, digital image frames of the assumed eye 604 may be captured with three different illumination directions. Image data of three digital image frames, each captured while illuminating the assumed eye from one of those direction, may be used for detecting the characteristic feature(s) in the iris of the assumed eye. Similarly, image data of all those three digital image frames may be used for determining the presence of the verification feature(s) in the assumed eye.

Alternatively, image data of different groups of digital image frames may be used for the verification feature determination and the characteristic iris feature detection. In one embodiment, image data of two digital image frames, one having been captured while illuminating the assumed eye by the third illumination element 616 and another while illuminating the assumed eye by one of the first and the second illumination elements 612, 613 may be used for determining the verification feature(s). Image data of two digital frames, one having been captured while illuminated illuminating the assumed eye by the first illumination element 612 and the other while illuminating the assumed eye by the second illumination element 613, may then be used for detecting the characteristic feature(s) of the iris of the assumed eye.

Figure 7:
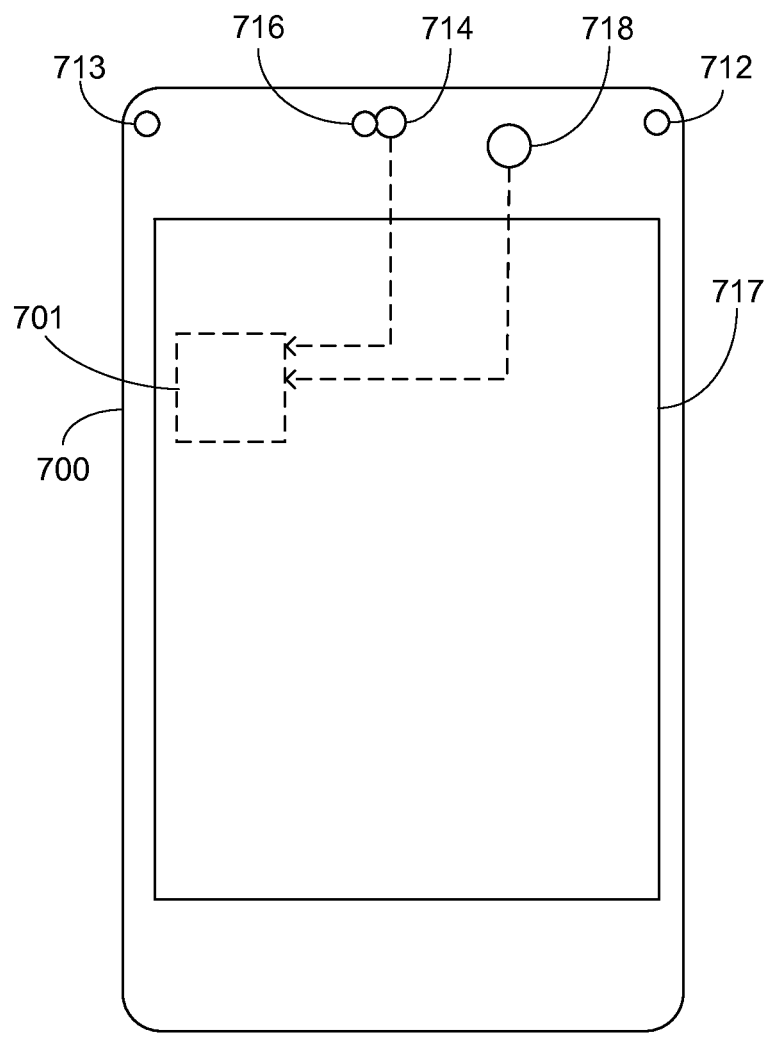
FIG. 7 illustrates a mobile device serving as an apparatus which may serve for iris recognition.

The apparatus 700 of FIG. 7, illustrated as a schematic front view, is mainly in accordance with the apparatus of FIG. 6. The first image sensor 714 has an adjustable optical axis. The apparatus 700 is a mobile electronic device such as a tablet computer or a smartphone. The first image sensor 714 as well as the first, second, and third illumination elements 712, 713, 716 are visible on the front side, i.e. on the side of a display 717 of the device, located close to one end of the apparatus.

The apparatus 700 further comprises a front facing camera 718. The processing unit 701 is connected both to the first image sensor and the front facing camera to receive image data of digital image frames captured by them. The front facing camera, which may otherwise serve for normal front facing camera purposes, may be configured to also serve as a second image sensor which captures, when in use, before the first image sensor 714 captures the two or more digital image frames while illuminating the assumed eye from different directions, a preliminary digital image frame of an assumed human face. The processing unit 701 may then determine, on the basis of image data of the preliminary digital image frame of the assumed human face, location of an assumed eye relative to the first image sensor 714. Based on this location, the adjustable optical axis of the first image sensor 714 may then be aimed towards the assumed eye for capturing the two or more digital image frames while illuminating the assumed eye from different directions.

Aiming the optical axis towards the determined location of the assumed eye may enable having a first image sensor which has a narrow field of view. This may enable efficient utilization of the frame area of the digital image frames captured by the first image sensor to the actual assumed eye and the iris thereof.

In the above, aspects primarily related to apparatus embodiments are discussed. However, the operation of the apparatuses is discussed above also from a method point of view. In the following, various embodiments will be discussed with emphasis on method aspects.

What is described above about the definitions, details, ways of implementation, and advantageous effects of the apparatuses and their operation apply, mutatis mutandis, to the method aspects discussed below. The same apply vice versa. Further, the above apparatuses and devices are examples of equipment for performing the methods described in the following. The other way round, the following methods are examples of possible ways of operation of the apparatuses and devices described above.

Figure 8:
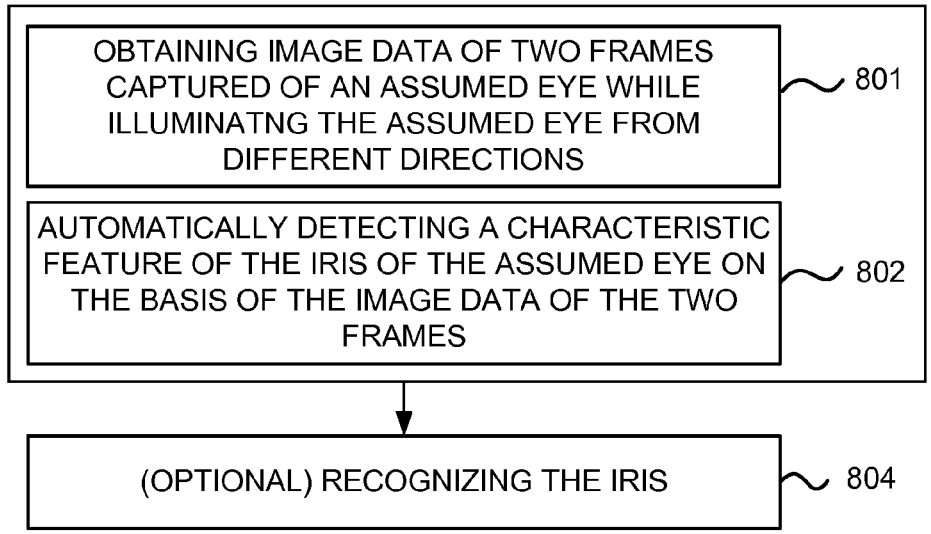
FIG. 8 illustrates a method which may be used for iris recognition.

The method of FIG. 8 starts by obtaining, in step 801, image data of two digital image frames captured of an assumed eye having an iris and a pupil while illuminating the assumed eye from different directions.

In step 802, one or more characteristic features of the iris, enabling recognition of the iris, are automatically detected on the basis of the obtained image data of the two digital image frames.

Information about detection of such characteristic features may be coded, for example, into a two dimensional graph according to some predetermined routine.

"Automatically" refers to performing the operation(s) at issue, for example, detecting a characteristic feature of the iris, by one or more appropriate data processing units or modules, such as the processing units discussed above with reference to FIGS. 1 to 7, according to predetermined rules and procedures, without need for any contribution provided or determination performed by a user of a device incorporating such unit or module.

The method of FIG. 8 may continue by an optional step 804 of actual recognition of the iris. In other words, on the basis of the detected characteristic features, it may be determined that the iris of which the digital image frames were captured, is a particular, existing iris belonging to a particular person.

Alternatively, the method may end at the detection of the characteristic feature(s) of the iris, in which case the later steps of identifying or recognizing the iris may be carried out separately, in a different process. The characteristic feature(s) may be stored in any appropriate way for such later recognition purposes.

Figure 9:
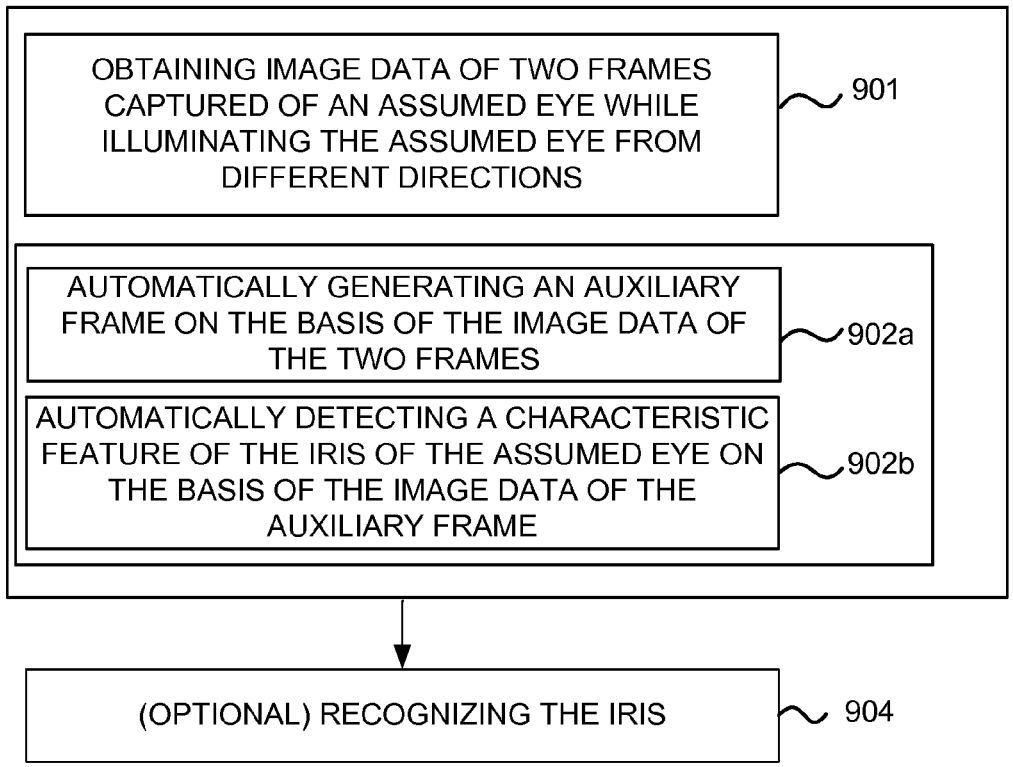
FIG. 9 illustrates a method which may be used for iris recognition.

The method of FIG. 9 is an example of the method of FIG. 8 where the step of detecting at least one characteristic feature of the iris on the basis of the image data of the two digital image frames captured while illuminating the assumed eye from different directions comprises two sub-steps. In the first sub-step 902a, an auxiliary image data is generated on the basis of the obtained image data of the two digital image frames. As described above with reference to FIG. 2, the auxiliary image data may be generated so as to indicate, or be dependent on, the differences between the two digital image frames with different illumination directions. Thereby, the image data of the auxiliary image frame may comprise, for example, information of one or more three-dimensional features of the iris.

In the second sub-step 902b, one or more characteristic features of the iris are detected on the basis of the image data of the auxiliary frame.

Figure 10:
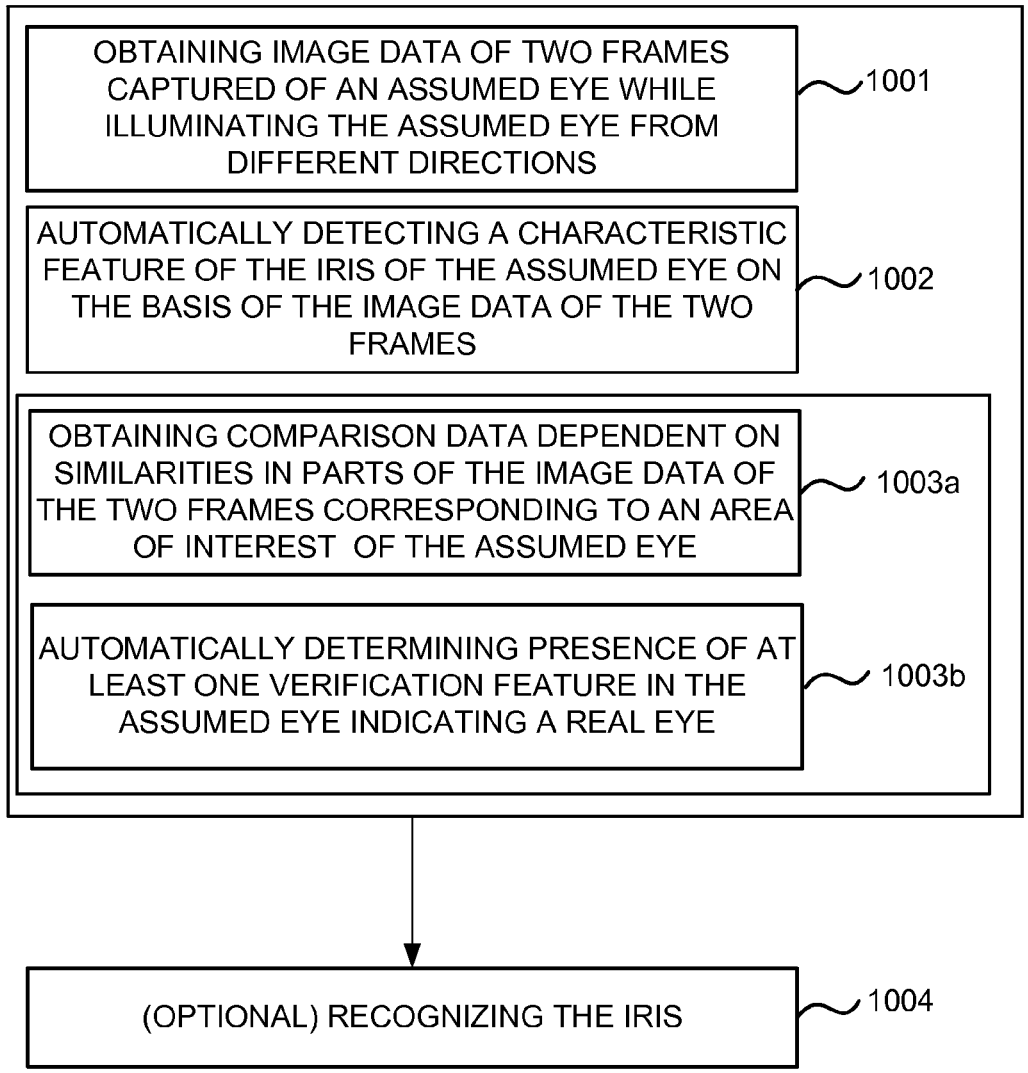
FIG. 10 illustrates a method which may be used for iris recognition.

The method of FIG. 10 comprises similar steps 1001, 1002 of obtaining image data and detecting at least characteristic feature of the iris as the method of FIG. 8. The latter step 1002 may comprise sub-steps similar to those of the method of FIG. 9.

The method of FIG. 10 further comprises verification of the nature of the assumed eye. First, in step 1003a, comparison data is obtained which comparison data is dependent on similarities in those parts of the image data of the two digital image frames which correspond to an area of interest of the assumed eye.

In step 1003b, it is automatically determined, on the basis of the comparison data, whether there is at least one such verification feature in the assumed eye which indicates that the assumed eye is a real eye. Such verification feature may be, for example, some structural detail of the iris selected so that in the case of a real eye, the three dimensional nature of the iris necessarily produces some differences in the image data between the two digital image frames. On the other hand, in the case of e.g. a two dimensional image of an eye as the assumed eye, the similarity in the image data for the selected area of interest of the assumed eye may be regarded as indication that the assumed eye is not a real eye.

The parts of the image data used for the comparison data may correspond, for example, to an area of the pupil of the assumed eye. Then, as described above with reference to FIGS. 3 and 5, with one of the two digital image frames having been captured while illuminating the assumed eye substantially from a direction of an optical axis of an image sensor, a retina located behind the pupil of a real eye causes reflection back to the image sensor which strongly decreases the similarity with corresponding image data of a digital image frame captured while illuminating the assumed eye from a different direction. This low similarity indicates presence of a retina in the assumed eye, thereby indicating that the assumed eye is a real one.

Figure 11:
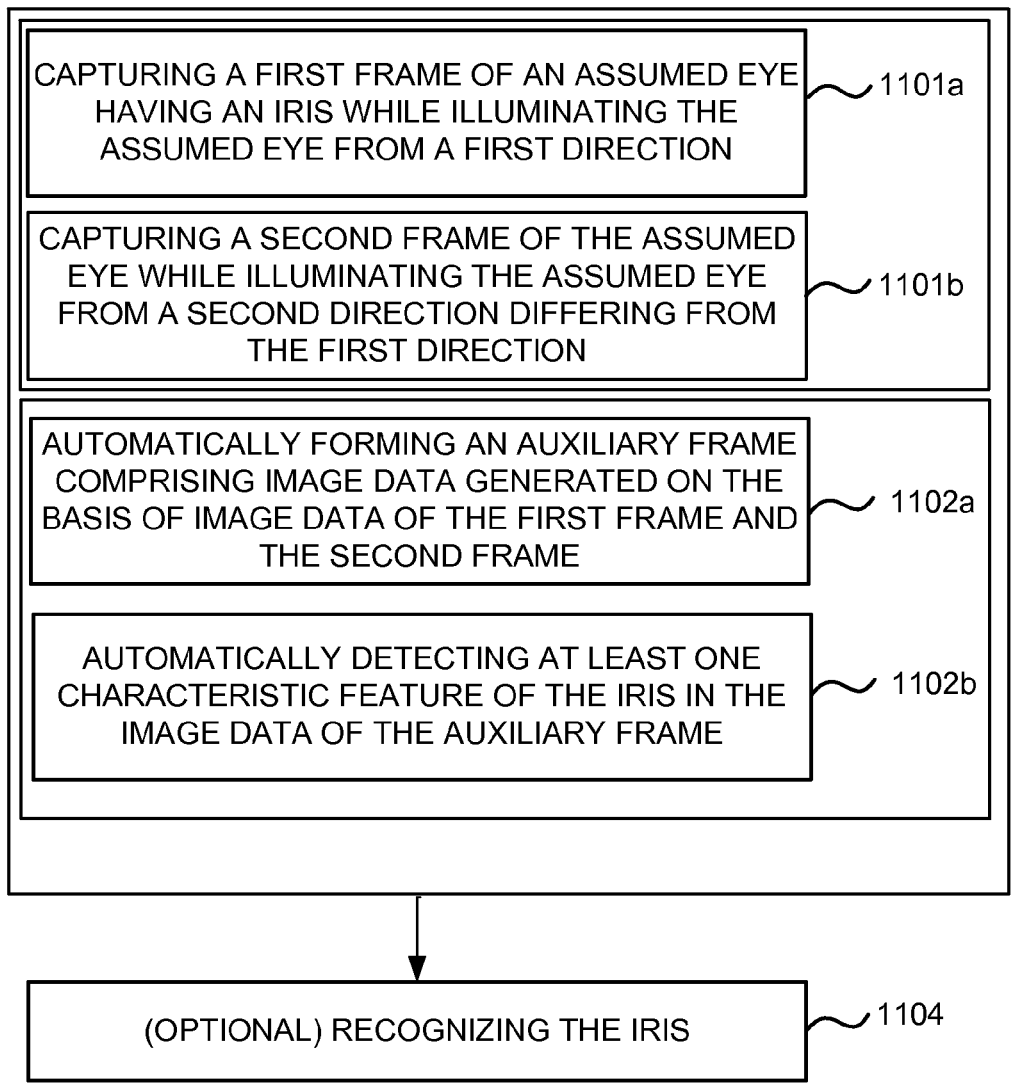
FIG. 11 illustrates a method which may be used for iris recognition.

In the method illustrated in FIG. 11, "obtaining" image of digital image frames comprises the actual capturing of the digital images.

The method of FIG. 11 starts by capturing, in step 1101a, a first digital image frame of an assumed eye while illuminating the assumed eye from a first direction.

In step 1101b, a second digital image frame is captured of the assumed eye while illuminating it from a second direction differing from the first direction. The angular difference may be, for example, 10 or 15 degrees or more. Bigger difference between the first and the second directions may result in greater differences in the image data in portions of the captured frames corresponding to three dimensional features of the iris. The first and the second direction may be aimed towards the assumed eye from opposite sides of an optical axis of an image sensor used for capturing the first and the second digital image frames. This may enhance the distinguishability of three dimensional iris features on the basis of the first and the two digital image frames.

An auxiliary image data is automatically generated in step 1102*a* on the basis of the two digital image frames captured while illuminating the assumed eye from the first and the second directions. As described above with reference to FIG. 2, the auxiliary image data may be generated, for example, so that it comprises image data which is dependent on differences between the image data of the first and the second digital image frames. Thereby, the auxiliary image data may contain information, for example, about three dimensional structural features of the iris of the assumed eye.

In step 1102*b*, at least one characteristic feature of the iris of the assumed eye is detected on the basis of image data of the auxiliary image frame, i.e. actually on the basis of the image data of the two digital image frames.

Similarly to the method of FIG. 8, the method of FIG. 11 may further comprise also one or more steps 1104 of actual iris recognition, where the detected characteristic feature(s) of the iris of the assumed eye are used in recognizing the person to whom the actual iris belongs.

Further, the method of FIG. 11 may also comprise verification of the assumed eye, for example, similarly as described above in reference to FIGS. 3, 5, and 10. Thereby, it may be possible to check, on the basis of at least one feature of the assumed eye indicating a real eye, whether the assumed eye is a real human eye or, for example, an image of such.

As yet another additional feature which may be present with or without one or both of the actual iris recognition and the assumed eye verification described above, a method as illustrated in FIG. 11 may comprise first, as described above with reference to FIG. 7, before capturing the first and the second digital image frames by the first image sensor, capturing, using a second image sensor, a preliminary digital image frame of an assumed human face. On the basis of image data of such frame, the location of an assumed eye relative to the first image sensor may then be automatically determined. Further, based on this location, the optical axis of the first image sensor may then be aimed towards the assumed eye for capturing the first and the second digital image frames.

Details of the methods of FIGS. 8 to 11, concerning e.g. the illumination of the assumed eye, the digital image frames, the comparison data as well as the auxiliary image and the image data thereof may be in accordance with operation of any of the apparatuses discussed above with reference to FIGS. 1 to 7.

The methods of FIGS. 8 to 11 may be carried out in and by any appropriate device or apparatus, some examples of which are given above with reference to the apparatuses of FIGS. 1 to 7.

In the methods of FIGS. 8 to 11, the steps of the methods may be carried out, whenever appropriate, in any order, and possibly at least partially overlapping in time.

In the apparatus and method embodiments discussed above, illumination of the assumed eye may be formed by infrared light, for example, near infrared light, not substantially visible for a human eye. Correspondingly, the illumination element(s) may be configured to emit light at an infrared wavelength range, and the image sensor(s) may be configured to sense infrared light.

For example, the assumed eye may be illuminated with light with maximum intensity at 780-820 nm. From an apparatus point of view, the first, second, and third illumination elements may emit, when in use, light at this wavelength range, and the first image sensor may have a maximum sensitivity at this wavelength range. Also the second image sensor may have a maximum sensitivity at this wavelength range. Alternatively, for example in embodiments with a front facing camera serving as the second image sensor, the second image sensor may have a maximum sensitivity at a visible wavelength range.

Some embodiments are further discussed shortly in the following.

In an apparatus aspect, an apparatus may be implemented comprising a processing unit configured to: obtain image data of a plurality of digital image frames captured of an assumed eye having an iris and a pupil while illuminating the assumed eye from different directions; and detect a characteristic feature of the iris on the basis of image data of at least two digital image frames of the plurality of digital image frames.

In an embodiment, the processing unit is configured to generate an auxiliary image frame on the basis of image data of at least two digital image frames of the plurality of digital image frames, and detect the characteristic feature on the basis of image data of the auxiliary image frame. The auxiliary image frame may comprise, for example, auxiliary image data dependent on differences between the at least two digital image frames on the basis of image data of which the auxiliary image frame is generated.

In an embodiment where the processing unit is configured to generate the auxiliary image frame, the at least two digital image frames of the plurality of digital image frames and the auxiliary image frame each comprises pixels, the image data of the auxiliary image frame comprising, for a pixel thereof, indication of a difference in the image data for corresponding pixels between the at least two digital image frames.

In any of the above embodiments where the processing unit is configured to generate an auxiliary image frame, the auxiliary image frame may comprise auxiliary image data containing data defining a three dimensional structural feature of the iris as the characteristic feature.

In an embodiment which may be in accordance with any of the above embodiments, the plurality of digital image frames being captured by a first image sensor having an optical axis, the obtained image data comprises image data of a first digital image frame captured of the assumed eye while illuminating the assumed eye from a first direction, and image data of a second digital image frame captured of the assumed eye while illuminating the assumed eye from a second direction, the first and the second directions being directed towards the assumed eye from opposite sides of the optical axis, with substantially equal angles relative to the optical axis.

In an embodiment which may be in accordance with any of the above embodiments, the processing unit is further configured to obtain comparison data dependent on similarities in parts of image data of at least two digital image frames of the plurality of digital image frames corresponding to an area of interest of the assumed eye; and determine, on the basis of the comparison data, presence of at least one verification feature in the assumed eye indicating a real eye.

Those at least two digital image frames may be the same at least two digital image frames on the basis of image data of which the processing unit detects the characteristic feature of the iris. Alternatively, the at least two digital image frames on the basis of image data of which the processing unit determines the presence of the verification feature(s) in the assumed eye, and the at least two digital image frames on the basis of image data of which the processing unit detects the characteristic feature(s) of the iris, may vary from each other by at least one digital image frame.

In the above embodiment comprising the use of comparison data, the plurality of digital image frames may be captured by a first image sensor having an optical axis, one of the at least two digital image frames on the image data of which the comparison data is based being captured while illuminating the assumed eye substantially from the direction of the optical axis, wherein the area of interest is an area of the pupil of the assumed eye, the verification feature comprising a retina behind the pupil.

In an embodiment which may be in accordance with any of the embodiments above, the apparatus further comprises: a first illumination element configured to illuminate the assumed eye from a first direction; a second illumination element configured to illuminate the assumed eye from a second direction differing from the first direction; and a first image sensor configured to capture a first digital image frame of the assumed eye while illuminating the assumed eye by the first illumination element, and a second digital image frame of the assumed eye while illuminating the assumed eye by the second illumination element, the processing unit being connected to the first image sensor to receive image data the first and the second digital image frames from the first image sensor.

In the above embodiment where the apparatus comprises the first and the second illumination elements and the first image sensor, the processing unit may be configured to: form an auxiliary digital image frame comprising image data generated on the basis of image data of the first digital image frame and the second digital image frame; and detect at least one characteristic feature of the iris in the auxiliary digital image frame.

The first and the second directions may be at an angle of at least 10 degrees, preferably at least 15 degrees, relative to each other.

In an embodiment which may be in accordance with any of the above embodiments where the apparatus comprises the first and the second illumination elements and the first image sensor, the first image sensor has an optical axis, the first and the second illumination elements being located on opposite sides of the optical axis, the first and the second directions being at substantially equal angles relative to the optical axis.

In an alternative embodiment, one of the first and the second directions is substantially aligned with the optical axis.

In an embodiment which may be in accordance with any of the above embodiments where the apparatus comprises the first and the second illumination elements and the first image sensor, the apparatus further comprises a second image sensor which may be configured to capture, before capturing the plurality of digital image frames while illuminating the assumed eye from different directions, a preliminary digital image frame of an assumed human face; the processing unit being further configured to determine, on the basis of image data of the preliminary digital image frame, location of an assumed eye relative to the first image sensor to enable appropriate aiming of the optical axis towards the location of the assumed eye.

In the above embodiments of the apparatus aspect, the elements of the apparatus unit, such as the processing unit, the first and the second illumination elements, the first image sensor, and the second image sensor "configured to" perform the various actions or steps, can alternatively be considered as "means for" performing those actions or steps.

In an embodiment which may be in accordance with any of the above embodiments, the apparatus is implemented as a portable or mobile electronic device, such as a laptop computer, a tablet computer, a smartphone, or a mobile phone.

In a first method aspect, a method may be implemented comprising: obtaining image data of a plurality of digital image frames captured of an assumed eye having an iris and a pupil while illuminating the assumed eye from different directions; and automatically detecting a characteristic feature of the iris on the basis of image data of at least two digital image frames of the plurality of digital image frames.

In an embodiment, the method comprises automatically generating an auxiliary image frame on the basis of image data of at least two digital image frames of the plurality of digital image frames, the characteristic feature being detected on the basis of image data of the auxiliary image frame. The auxiliary image frame may be generated so as to comprise auxiliary image data dependent on differences between the at least two digital image frames on the basis of image data of which the auxiliary image frame is generated.

In an embodiment comprising the generation of the auxiliary image frame, the at least two digital image frames on the basis of image data of which the auxiliary image frame is generated and the auxiliary image frame each comprises pixels, the image data of the auxiliary image frame comprising, for a pixel thereof, indication of a difference in the image data for corresponding pixels between the at least two digital image frames.

In any of the above embodiments where an auxiliary image frame is generated, the auxiliary image frame may be generated so as to comprise auxiliary image data containing data defining a three dimensional structural feature of the iris as the characteristic feature.

In an embodiment which may be in accordance with any of the above embodiments of the first method aspect, the plurality of digital image frames being captured by a first image sensor having an optical axis, the obtained image data comprises image data of a first digital image frame captured of the assumed eye while illuminating the assumed eye from a first direction, and image data of a second digital image frame captured of the assumed eye while illuminating the assumed eye from a second direction, the first and the second directions being directed towards the assumed eye from opposite sides of the optical axis, with substantially equal angles relative to the optical axis.

In embodiment which may be in accordance with any of the above embodiments of the first method aspect, the obtained image data comprises image data of a first digital image frame captured of the assumed eye while illuminating the assumed eye from a first direction, and image data of a second digital image frame captured of the assumed eye while illuminating the assumed eye from a second direction, the first and the second directions being at an angle of at least 10 degrees, preferably at least 15 degrees, relative to each other.

In an embodiment which may be in accordance with any of the above embodiments of the first method aspect, the method further comprises: obtaining comparison data dependent on similarities in parts of image data of at least two digital image frames of the plurality of digital image frames corresponding to an area of interest of the assumed eye; and automatically determining, on the basis of the comparison data, presence of at least one verification feature in the assumed eye indicating a real eye. Those at least two digital image frames may be the same at least two digital image frames on the basis of image data of which the processing unit determines the presence of the verification feature(s) in the assumed eye is determined. Alternatively, the at least two digital image frames on the basis of image data of which the processing unit determines the presence of the verification feature(s) in the assumed eye is determined, and the at least two digital image frames on the basis of image data of which the processing unit detects the characteristic feature(s) of the iris is detected, may vary from each other by at least one digital image frame.

In an embodiment in accordance with the previous embodiment, the plurality of digital image frames captured while illuminating the assumed eye from different directions being captured by a first image sensor having an optical axis, one of the at least two digital image frames on the image data of which the comparison data is based being captured while illuminating the assumed eye substantially from the direction of the optical axis, the area of interest is an area of the pupil of the assumed eye, the verification feature comprising a retina behind the pupil.

In a second method aspect, a method may be implemented comprising: capturing a first digital image frame of an assumed eye having an iris while illuminating the assumed eye from a first direction; capturing a second digital image frame of the assumed eye while illuminating the assumed eye from a second direction differing from the first direction; automatically forming an auxiliary digital image frame comprising image data generated on the basis of image data of the first digital image frame and the second digital image frame; and automatically detecting at least one characteristic feature of the iris in the image data of the auxiliary digital image frame. The first and the second directions may be at an angle of at least 10 degrees, preferably at least 15 degrees, relative to each other.

In an embodiment, the first and the second digital image frames being captured by a first image sensor having an optical axis, the first and the second directions lie at opposite sides of the optical axis, with substantially equal angles relative to the optical axis.

In an alternative embodiment, one of the first and the second directions is substantially aligned with the optical axis.

In an embodiment which may be in accordance with any of the above embodiments of the second method aspect, the first and the second digital image frames being captured by a first image sensor having an optical axis, the method further comprises, before capturing the first and the second digital image frames: capturing, using a second image sensor, a preliminary digital image frame of an assumed human face; automatically determining, on the basis of image data of the preliminary digital image frame of the assumed human face, location of an assumed eye relative to the first image sensor; and automatically aiming the optical axis towards the location of the assumed eye.

In any of the above embodiments of the first and the second method aspects, the method may further comprise automatically recognizing the iris of the assumed eye on the basis of at least one detected characteristic feature of the iris.

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in lap top computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. An apparatus comprising;
a single illumination unit for illuminating objects;
a processing unit configured to:
    obtain image data of a plurality of digital image frames captured by an image sensor of an assumed eye having an iris and a pupil, wherein a first digital image frame is captured by the image sensor while the assumed eye is illuminated from a first direction with the illumination unit and a second digital image frame is captured by the image sensor while the assumed eye is illuminated from a second direction with the illumination unit;
    generate an auxiliary image frame that combines a portion of the first digital image frame with a portion of the second digital image frame, wherein the auxiliary image frame defines at least one three-dimensional structural feature of the assumed eye; and
    detect the at least one three-dimensional structural feature of the assumed eye using image data in the auxiliary image frame from both the first digital image frame and the second digital image frame; and
    verify the iris using the at least one three-dimensional structural feature of the assumed eye detected from in the auxiliary image frame.

2. An apparatus as defined in claim 1, wherein the processing unit is further configured to compare the detected three-dimensional structural feature of the assumed eye with characteristic features of a plurality of other eyes.

3. An apparatus as defined in claim 2, wherein the auxiliary image frame comprises auxiliary image data dependent on differences between the first digital image frame and the second digital image frame.

4. An apparatus as defined in claim 1, wherein the first and the second directions are directed toward the assumed eye from opposite sides of the optical axis.

5. An apparatus as defined in claim 1, wherein the processing unit is further configured to:
- obtain comparison data dependent on similarities in parts of the first digital image frame and the second digital image frame; and
- determine, on the basis of the comparison data, presence of at least one verification feature in the assumed eye indicating a real eye.

6. An apparatus as defined in claim 5, the plurality of digital image frames being captured by a first image sensor having an optical axis, one of the at least two digital image frames on the image data of which the comparison data is based being captured while illuminating the assumed eye substantially from the direction of the optical axis.

7. An apparatus as defined in claim 1, further comprising:
- a first illumination element configured to illuminate the assumed eye from the first direction;
- a second illumination element configured to illuminate the assumed eye from the second direction differing from the first direction; and
- a first image sensor configured to capture the first digital image frame of the assumed eye while illuminating the assumed eye by the first illumination element, and the second digital image frame of the assumed eye while illuminating the assumed eye by the second illumination element.

8. An apparatus as defined in claim 7, wherein the first and the second directions are at an angle of at least 10 degrees relative to each other.

9. An apparatus as defined in claim 7, wherein the first image sensor has an optical axis, the first and the second illumination elements being located on opposite sides of the optical axis.

10. An apparatus as defined in claim 7, wherein the first image sensor has an optical axis, one of the first and the second directions being substantially aligned with the optical axis.

11. An apparatus as defined in claim 1, implemented as a portable or mobile electronic device.

12. A method comprising:
- obtaining, from a sensor, image data of a plurality of digital image frames captured of an assumed eye having an iris and a pupil, wherein a first digital frame is captured by the images sensor while the assumed eye is illuminated from a first direction and a second digital image frame is captured by the image sensor while the assumed eye is illuminated from a second direction;
- generating an auxiliary image frame that combines a portion of the first digital image frame with a portion of the second digital image frame, wherein the auxiliary image frame defines at least one three-dimensional structure feature of the assumed eye;
- detecting the at least one three-dimensional structural feature of the assumed eye using image data in the auxiliary image frame from both the first digital image frame and the second digital image frame; and
- verifying the assumed eye using the at least one three-dimensional structural feature of the assumed eye detected in the auxiliary image frame.

13. A method as defined in claim 12, further comprising transmitting the detected at least one three-dimensional structural feature of the assumed eye to one or more remote computing devices for comparison with a plurality of other images associated with other eyes.

14. A method as defined in claim 12, wherein the auxiliary image frame comprises auxiliary image data dependent on differences between the first image frame and the second image frame.

15. A method as defined in claim 12, the first digital frame being captured by a first image sensor having an optical axis, wherein the first and the second directions are directed towards the assumed eye from opposite sides of the optical axis, with substantially equal angles relative to the optical axis.

16. A method as defined in claim 12, further comprising:
- obtaining comparison data dependent on similarities in parts from at least two of the plurality of digital image frames corresponding to an area of interest of the assumed eye; and
- automatically determining, on the basis of the comparison data, presence of at least one verification feature in the assumed eye indicating a real eye.

17. A method as defined in claim 16, wherein the plurality of digital image frames are captured by a first image sensor having an optical axis, one of the at least two digital image frames on the image data of which the comparison data is based being captured while illuminating the assumed eye substantially from the direction of the optical axis, wherein the area of interest is an area of the pupil of the assumed eye.

18. A method comprising:
- capturing, by a sensor, a first digital image frame of an assumed eye having an iris while illuminating the assumed eye from a first direction;
- capturing, by the sensor, a second digital image frame of the assumed eye while illuminating the assumed eye from a second direction differing from the first direction;
- creating an auxiliary digital image frame that combines image data generated from the first digital image frame and the second digital image frame, wherein the auxiliary digital image frame defines at least one three-dimensional structural feature of the assumed eye; and
- detecting the at least one three-dimensional structural feature of the iris in the image data of the auxiliary digital image frame using image data in the auxiliary digital image from both the first digital image frame and the second digital image frame; and
- verifying the iris using the at least one three-dimensional structural feature of the assumed eye detected in the auxiliary image frame.

19. A method as defined in claim 18, the first and the second directions being at an angle of at least 10 degrees relative to each other.

20. A method as defined in claim 18, the first and the second digital image frames being captured by a first image sensor having an optical axis, the first and the second directions lying at opposite sides of the optical axis, with substantially equal angles relative to the optical axis.

21. An apparatus as defined in claim 1, wherein illumination of the assumed eye is performed, at least partially, using infrared light.

22. A method as defined in claim 12, wherein illumination of the assumed eye is performed, at least partially, using infrared light.

* * * * *